United States Patent [19]

Hosoi et al.

[11] 4,405,426

[45] Sep. 20, 1983

[54] SELF-CURING IRRADIATED BLEND OF EPOXY RESIN AND SALT OF QUATERNARY AMINO ESTER OF UNSATURATED ACID

[75] Inventors: Fumio Hosoi, Fujioka; Takashi Sasaki, Takasaki; Miyuki Hagiwara, Maebashi, all of Japan

[73] Assignee: Japan Atomic Energy Research Institute, Tokyo, Japan

[21] Appl. No.: 369,612

[22] Filed: Apr. 19, 1982

[30] Foreign Application Priority Data

Apr. 30, 1981 [JP] Japan .................................. 56-65840

[51] Int. Cl.$^3$ ...................... C08F 2/54; C08F 220/34; C08G 59/20; C08L 63/00
[52] U.S. Cl. ........................... 204/159.15; 204/159.22; 525/529; 524/414; 528/121
[58] Field of Search ................... 204/159.15; 525/529; 528/121; 524/414

[56] References Cited

U.S. PATENT DOCUMENTS

| | | | |
|---|---|---|---|
| 2,831,781 | 4/1958 | Upson et al. | 260/DIG. 18 |
| 2,928,794 | 3/1960 | Belanger et al. | 528/121 |
| 2,928,809 | 3/1960 | Hicks | 528/121 |
| 2,965,594 | 12/1960 | Maeder | 524/724 |
| 3,183,281 | 5/1965 | Clemens | 525/108 |
| 3,893,974 | 7/1975 | Niino et al. | 528/121 |
| 4,212,781 | 7/1980 | Evans et al. | 428/460 |

*Primary Examiner*—John C. Bleutge
*Assistant Examiner*—A. H. Koeckert
*Attorney, Agent, or Firm*—Browdy and Neimark

[57] ABSTRACT

A self-curing modified epoxy resin composition produced by irradiating with electron beams a mixture of an epoxy resin, a quaternary salt of $\alpha,\beta$-unsaturated carboxylic acid ester having one quaternized amine nitrogen in the ester group, and optionally a monomer having one ethylenically unsaturated bond in the molecule, as well as an aqueous dispersion of such resin composition is herein disclosed.

13 Claims, No Drawings

SELF-CURING IRRADIATED BLEND OF EPOXY RESIN AND SALT OF QUATERNARY AMINO ESTER OF UNSATURATED ACID

FIELD OF THE INVENTION

The present invention relates to a self-curing modified epoxy resin composition and an aqueous dispersion thereof. More particularly, the invention relates to a self-curing modified epoxy resin composition produced by irradiating with electron beams a mixture of an epoxy resin, a quaternary salt of $\alpha,\beta$-unsaturated carboxylic acid ester having one quaternized amine nitrogen in the ester group, and optionally a monomer having one ethylenically unsaturated bond in the molecule, as well as an aqueous dispersion of such resin composition.

BACKGROUND OF THE INVENTION

Epoxy resins have good mechanical properties, great resistance to heat and chemicals, and high bond strength, so they are widely used as thermosetting resins is laminated sheets, adhesives or paints. Organic solvents have conventionally been used as a dispersion medium for forming epoxy resins and other synthetic resins into a thin film, but to meet the social demand for controlling pollution and saving resources, active efforts are being made to develop water-reducible resins that can replace the current organic solvent-dispersible resins.

Two techniques are known for dispersing synthetic resins in water: one is (1) the forced emulsification method wherein a surfactant is used to cause the resin to be emulsified in a medium mainly composed of water, and the other is (2) the hydrophilic group grafting method wherein a polymerizable hydrophilic vinyl compound is grafted onto the resin. The first method is commonly employed to disperse epoxy resin in water, but this method has the following defects: (a) the resulting aqueous dispersion is not stable and the epoxy resin easily separate from water; (b) the epoxy resin is not dispersed uniformly (i.e. the size of the dispersed particles is not uniform), so the subsequent curing of the resin is not performed uniformly to produce a resin product having good properties; and (c) because of the use of a large amount of surfactant, the resulting resin film has poor water resistance and bonding strength and at the same time, the surfactant is released from the film into water.

The second method is a rather recent technique proposed in Japanese Patent Public Disclosure No. 1228/78, see U.S. Pat. No. 4,212,781, and it has the following defects: (a) since the method involves a reaction in an organic solvent, much organic solvent is necessary and the residual monomer is difficult to remove; and (b) the grafting efficiency of the method is low and the ungrafted portion of the resulting film easily separates from the grafted portion to thereby impair the physical properties of the film. Therefore, it has been desired in the art to develop a chemically stable, water-reducible resin composition that has great resistance to water and solvents as well as good physical properties. According to the present invention, a water-reducible epoxy resin composition is provided by irradiating a mixture of an epoxy resin and a radical-polymerizable vinyl compound with electron beams. There are two conventional methods whose concept is similar to that of the present invention: (1) a mixture of an epoxy resin and a radical-polymerizable monomer having a carboxyl group is irradiated with electron beams to make the epoxy resin water-reducible; (2) a mixture of an epoxy resin and a radical-polymerizable monomer having a nondissociative hydrophilic group such as a hydroxyl group or ether bonded group is irradiated with electron beams to thereby make the epoxy resin water-reducible. The epoxy resin to which the carboxyl-having monomer is grafted is made water-reducible by adding an alkali such as amine to dissociate the carboxyl group, but since the product contains not only the epoxy group but also the acid and amine that cause the reaction of opening the epoxy ring, the aqueous dispersion of the product cannot be stored for an extended period without changing its properties, and at the same time, a film of resin does not reflect satisfactorily the desired mechanical properties, such as high impact resistance, of the epoxy resin. The epoxy resin to which a nondissociative monomer having a hydroxyl group or ether bonded group is grafted is made water-reducible by adding water to the resin after it is dissolved or swollen in a suitable organic solvent. But to prevent the agglomeration of the dispersed resin particles, the specific resin formulation requires more rigorous limitations on the formulation and amount of the organic solvent and the proportion of water in the dispersion than those required for the aqueous dispersion of the resin to which a carboxyl group is grafted.

SUMMARY OF THE INVENTION

The present inventors have made various studies to produce a chemically stable water-reducible epoxy resin that is entirely free from the defects of the conventional techniques and which has not only great resistance to water and solvents but also good physical properties. As a result, the inventors have developed a new technique that attains this object. The present invention provides a water-reducible epoxy resin composition, but more generally, it is applicable to modified epoxy resin bases.

The basic concept of the method for producing the resin composition of the present invention is to irradiate with electron beams a shaped article of a mixture mainly composed of a solid or liquid epoxy resin (hereunder sometimes referred to as "component A") and a quaternary salt of $\alpha,\beta$-unsaturated carboxylic acid ester having one quaternized amine nitrogen atom in the ester group (the salt is hereunder sometimes referred to as "component B"). The resin composition of the present invention may also be produced by incorporating in the system of "component A" and "component B" a polymerizable monomer having one ethylenically unsaturated bond in the molecule (said monomer is hereunder sometimes referred to as "component C"), shaping the mixture into a suitable form, and irradiating the shaped mixture with electron beams. The purpose of adding "component C" is to help "component B" to be dissolved in "component A".

The aqueous dispersion of resin composition obtained by using "component C" is more chemically stable and the cured film obtained from the aqueous dispersion is more rich in transparency and flexibility. Therefore, the invention using "component C" should be considered to be an improvement of the aforesaid basic concept of this invention and is also included in the scope of the present invention.

Amines are conventionally used as agents for curing epoxy resins, and it is well known that the curing speed is increased by using lower alkyl amines. Therefore, as in a conventional technique whose concept is similar to that of the present invention, the epoxy resin can be made water-dispersible by grafting a radical-polymerizable unsaturated monomer containing an acrylic or methacrylic acid ester having an ester group such as a dimethylaminoethyl or diethylaminoethyl group, but because of the curing reaction that occurs between the amino group and epoxy group in the particles dispersed in water, the aqueous dispersion of epoxy resin does not remain stable for an extended period of storage. As a result of various studies to eliminate this defect of the conventional technique, the present inventors have found that by using a quaternary salt of $\alpha,\beta$-unsaturated carboxylic acid having one quaternizable nitrogen atom in the ester group, an aqueous dispersion of epoxy resin that comprises unexpectedly finer and more stable particles than those produced by the conventional technique and which has selfcuring properties can be produced. It has also been found that the size of the resin particles dispersed in water can be freely controlled by varying the amount of the quaternary salt of the acrylic or methacrylic acid ester of alkyl amine to be mixed with the epoxy resin. The present invention has been accomplished on the basis of these findings.

In the present invention, if the mixture of "component A" and "component B" is irradiated with electron beams, part of "component B" is grafted onto the epoxy resin ("component A") and a solid product comprising a uniform mixture of the graft polymer, non-graft polymer and non-graft epoxy resin is present. The "graft polymer" is the epoxy resin to which the quaternary salt of the acrylic or methacrylic acid ester of alkyl amine is grafted, and this graft polymer works as an emulsifier that helps to form a stable dispersion of the non-graft epoxy resin in an aqueous solvent. The "non-graft polymer" is the product of addition polymerization of "component B" without being grafted onto the epoxy resin, and it is soluble or dispersible in water. Therefore, the epoxy resin composition produced by irradiating the mixture of "component A" and "component B" with electron beams is water-reducible.

DETAILED DESCRIPTION OF THE INVENTION

The epoxy resin to be used in the present invention may be selected from among all known epoxy resins that are typified by what we call "bisphenol A type diglycidyl ethers" of the following formula:

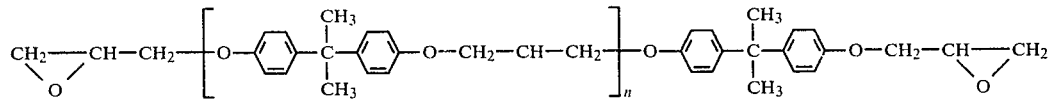

(wherein n is generally from 0 to 8). The epoxy resin preferably contains at least one methylene or methine group in the molecule but does not contain a nonaromatic carbon-carbon double bond. This is for the purpose of increasing the efficiency of grafting by irradiation with electron beams and of preventing the formation of a three-dimensional network. The quaternary salt of $\alpha,\beta$-unsaturated carboxylic acid ester that contains one quaternizable amine nitrogen atom in the ester group is one of the essential components of the present invention, and it is the radical polymerizable quaternary ammonium salt obtained by addition reaction between an $\alpha,\beta$-unsaturated carboxylic acid ester [the ester group being a 2-N,N-dimethylaminoethyl group, 2-N,N-diethylaminoethyl group, 2-N,N-dibutylaminoethyl group, 3-N,N-diethylaminopropyl group, 2-N,N-dibutylaminopropyl group, 3-N,N-dibutylaminopropyl group, 2-N-t-butylaminoethyl group, 2-N-ethyl-N-(hydroxyethyl)aminoethyl group or 3-N,N-dimethylamino-2-hydroxypropyl group] and a low-boiling alkyl halide such as methyl chloride or ethyl chloride. Illustrative quaternary salts are methacryloyloxyethyltrimethylammonium chloride and 3-methacryloyloxy-2-hydroxypropyltrimethylammonium chloride. Polymers of these salts are dissociated upon addition of water and provide a positive charge to the graft polymer chain and non-graft polymer chain. These quaternary salts are used in an amount of 2 to 30% by weight, preferably from 3 to 20% by weight, of the resulting resin composition. If less than 2% by weight of the salts is used, the composition produced is not easily dispersed in water, and if more than 30% by weight of the salts is used, an aqueous dispersion of the resulting composition is poor in chemical stability, because of high concentration of the salts and furthermore, the cured film obtained from the aqueous dispersion is opaque and ununiform, since the water resistance of the resulting resin film is low, because of residual hydrophylic group unreacted.

"Component C" or the polymerizable ethylenically unsaturated monomer is preferably miscible with the epoxy resin and it is used to help "component B" dissolve in the epoxy resin. Illustrative examples of "component C" are styrene, $\beta$-methoxystyrene, $\gamma$-methylstyrene, acrylic acid ester, methacrylic acid ester, acrylonitrile and methacrylonitrile. "Component C" is used in an effective amount of 38% by weight or less on the basis of the resulting resin composition. If "component C" is used in an amount of more than 38% by weight, the resulting resin composition cannot be dispersed in water. If "component C" is used in the present invention, a mixture of "component A" and "component C" is made first, and then "component B" is added to the mixture. If "component A" is an epoxy resin having low molecular weight and hence low viscosity, the mixture of "component A" and "component C" is heated at between 60° and 70° C. and agitated with a conventional stirrer. If "component A" is an epoxy resin having high molecular weight and hence high viscosity, the mixture is agitated with a kneader or other suitable means, preferably at an elevated temperature not higher than 100° C. "Component B" is preferably added to the mixture of "component A" and "component C" while the temperature is held below 50° C. to prevent any reaction between the ammonium salt and epoxy group. Since most ammonium salts are soluble only in polar solvents including water and alcohol, addition of a small amount of an organic polar solvent is very effective for achieving uniform mixing of the three components. These procedures may be followed in an inert gas atmosphere so as to accelerate the reaction that is initiated by electron beams.

The mixture of "component A", "component B" and optionally "component C" is formed into a sheet 0.1 mm thick, covered with a polyester film and irradiated with electron beams. The total thickness of the sheet is determined by the energy of electron beams from the accelerator. The sheet is irradiated at a temperature between $-50°$ and $50°$ C. with electron beams in a dose rate of from $1 \times 10^4$ to $3 \times 10^6$ rad/sec, preferably from 0.5 to 2.5 Mrad/sec, to give a total dose of 0.5 to 50 Mrad. To cool the sheet to a temperature below $-50°$ C. is not only uneconomical but also causes a decrease in the reaction rate. If the temperature is more than $50°$ C., the crosslinking reaction may occur. The dose rate is determined by the performance of the irradiation equipment used. If the total dose is less than 0.5 Mrad, much monomer is left unpolymerized, and to give a total dose of more than 50 Mrad is not only unnecessary but also causes undesired phenomena such as crosslinking. The solid product produced by the irradiation with electron beams is ground into fine particles having an average size of 1 mm or less, the fine particles are dissolved or swollen in an organic solvent, and mixed with water under agitation to thereby produce an aqueous dispersion of the resin composition. Examples of the organic solvent are n-butanol, cyclohexanone, cyclohexanol, butyl Cellosolve (ethylene glycol monobutyl ether) and tetrahydrofuran, and these solvents may be used alone or in combination. A preferred organic solvent contains at least 25% by weight of n-butanol, and the specific composition of the organic solvent is determined depending upon the compositions of "component B" and "component C". The organic solvent is generally used in an amount of from 30 to 100 parts by weight on the basis of 100 parts by weight of the resin.

The steps of dissolving the fine particles of resin product in an organic solvent and dispersing the same in water are preferably performed at a temperature not exceeding $50°$ C., because the modified resin composition of the present invention is essentially self-curing. The amount of water added is generally from 30 to 700 parts by weight, preferably from 100 to 500 parts by weight, on the basis of 100 parts by weight of the fine particles of resin. More importantly, the epoxy resin modified by the treatment with electron beams under the conditions mentioned above has particularly high emulsifying ability and is capable of dispersing even an untreated epoxy resin in water. To this end, an intimate mixture of the particles of the epoxy resin that has been irradiated with electron beams and the unirradiated epoxy resin is dissolved or swollen in an organic solvent, and is mixed with water under stirring. The amount of the unirradiated epoxy resin that can be dispersed in water depends on the structure and amount of the quaternary salt of acrylic or methacrylic acid ester of nitrogen compound that is subjected to irradiation with electron beams, as well as on the irradiation conditions. Usually, 20 to 300 parts by weight of the unirradiated epoxy resin is used on the basis of 100 parts by weight of the irradiated epoxy resin.

According to the present invention, "component B" provides the epoxy resin composition with self-curing properties, so a curing accelerator is not particularly needed for curing the resin composition. But it is to be understood that for the purpose of increasing the curing speed, a known method may be used without any detrimental effect, for example, a small amount of water-soluble amino resin may be added as a curing accelerator.

The advantages of the present invention are now described in more detail by reference to the following examples and comparative examples.

EXAMPLE 1

A four-necked glass flask having a capacity of 300 ml and equipped with a muddler, a nitrogen introducing pipe, a thermometer and a cooling pipe was charged with 70 g of an epoxy resin (Epikote 1007 of Shell International Chemicals Corp.), 13.7 g of styrene and 9.1 g of methyl acrylate (both being "component C"). The mixture was stirred at $64°$ C. for one hour until the styrene and methyl acrylate were mixed with the epoxy resin uniformly. After cooling the mixture to room temperature, 7.2 g of methacryloyloxyethyltrimethylammonium chloride were added to the mixture as "component B" together with 10 g of ethanol and the resulting mixture was stirred for about 30 minutes in a nitrogen atmosphere until a highly viscous but uniform mixture of the epoxy resin and the three monomers was obtained. The product was sandwiched between two square polyester films (Diafoil of Mitsubishi Chemical Industries, Limited) each having a thickness of 0.1 mm and a width of 30 cm, and stamped with a press into a circular sheet 2 mm thick. The sample sandwiched between Mylar films, placed on an ice bath and irradiated with 2.7 Mrad/sec of electron beams from a Cockcroft-Walton accelerator at an acceleration voltage of 2 MeV and a current of 6 mA to give a total dose of 21 Mrad. The irradiated sample was transparent and firm and could be easily removed from the Mylar films.

Fine particles (20 g) of the sheet were put in a flask having a capacity of 300 ml, and after adding 14 g of a mixed solvent made of butanol, cyclohexanone, cyclohexanol and butyl Cellosolve (1:1:1:1 by weight), the mixture was stirred with an 3-blended impeller for 2 hours at room temperature. Then, 66 g of purified water was added gradually to the mixture under vigorous agitation to give an aqueous dispersion that is characterized in Table 1 below.

COMPARATIVE EXAMPLES 1 AND 2

Aqueous dispersions of epoxy resin were prepared as in Example 1 except that methacryloyloxyethyltrimethylammonium chloride as "component B" was replaced by methacrylic acid (Comparative Example 1) and diethylaminoethyl methacrylate (Comparative Example 2) and dimethylaminoethanol or acetic acid was added to each dispersion so that the charge density on the surface of the dispersion was equal to that of the dispersion of Example 1. The properties of each aqueous dispersion are also shown in Table 1 below, from which one can see that a stable aqueous dispersion comprising fine particles and having a high concentration of the residual epoxy group could be produced by using methacryloyloxyethyltrimethyl ammonium chloride that was a quaternary ammonium salt of dimethylamino ester of methacrylic acid.

TABLE 1

| Example | monomer (g) | | | particle size | viscosity | residual epoxy group after storage for one month (%)* | precipitate formed after storage for one month |
|---|---|---|---|---|---|---|---|
| | styrene | methyl acrylate | hydrophilic monomer | | | | |
| Example 1 | 13.7 | 9.1 | 7.2 | 0.08 | 5.2 | 78 | none |
| Comparative Example 1 | 12.0 | 8.0 | 10.0 | 0.5 | 4.5 | 70 | present |
| Comparative Example 2 | 14.1 | 9.4 | 6.5 | 0.13 | 4.5 | 49 | none |

*$\left(\dfrac{\text{epoxy number of residual epoxy group in aqueous dispersion}}{\text{original epoxy number for epoxy resin}}\right) \times 100\%$

EXAMPLES 2 TO 5

Epikote 1007 and "component C" in the amounts indicated in Table 2 below were kneaded as in Example 1. The respective mixtures were kneaded as in Example 1 and cooled to room temperature. Methacryloyloxyethyltrimethylammonium chloride in the amounts indicated in Table 2 was added as a hydrophilic monomer to the respective mixture together with ethanol, and stirred in a nitrogen atmosphere for about 30 minutes and shaped into circular plates each having a thickness of about 2 mm. The respective sheets were irradiated with electron beams from a Cockcroft-Walton accelerator as in Example 1 to give the total doses indicated in Table 2. The irradiated sheets were ground into fine particles and dissolved in a mixed solvent made of butanol, cyclohexanone, cyclohexanol and butyl cellosolve (1:1:1:1 by weight), and to the solutions, 66 g of purified water was added gradually under vigorous agitation to thereby produce aqueous dispersions. The properties of the aqueous dispersions are shown in Table 2, from which one can see that stable aqueous dispersions of epoxy resin could be produced by using methacryloyloxyethyltrimethylammonium chloride as a hydrophilic monomer and that the size of the particles in the dispersions could be freely controlled by varying the amount of the hydrophilic monomer added.

TABLE 2

| Example No. | epoxy resin (g) | monomer (g) | | | total dose (M rad) | particle size (μ) | viscosity (c.p.) | precipitate formed after storage for one month |
|---|---|---|---|---|---|---|---|---|
| | | styrene | methyl acrylate | hydrophilic monomer | | | | |
| 2 | 70 | 12.0 | 8.0 | 10.0 | 45 | <0.08 | 5.8 | none |
| 3 | 70 | 15.2 | 10.0 | 4.8 | 39 | 0.15 | 4.0 | none |
| 4 | 70 | 15.9 | 10.5 | 3.6 | 24 | 0.40 | 3.6 | none |
| 5 | 80 | 9.2 | 6.1 | 4.8 | 15 | 0.25 | 6.4 | none |

EXAMPLE 6

A four-necked glass flask the same as used in Example 1 was charged with 70 g of Epikote 1007 and 13.1 g of styrene and 8.7 g of methyl acrylate (both being "component C"), and the mixture was kneaded as in Example 1 and cooled to room temperature. To the mixture, 8.2 g of 3-methacryloyloxy-2-hydroxypropyltrimethylammonium chloride was added as "component B" together with 10 g of ethanol and 5 g of acetone, and the resulting mixture was kneaded for 30 minutes in a nitrogen atmosphere and shaped into a circular sheet having a thickness of 2 mm. The sheet was irradiated with electron beams from a Cockcroft-Walton accelerator as in Example 1 to give a total dose of 45 Mrad. The irradiated sheet was removed from Mylar films and pulverized into fine particles of a size of 1 mm or less. Twenty grams of the particles were put in a 300-ml flask and mixed with 14 g of a mixed solvent of butanol, cyclohexanone, cyclohexanol and butyl Cellosolve (2:1:2:1 by weight) under agitation for 2 hours until a complete solution was produced. To the solution, 66 g of purified water was gradually added under vigorous agitation to thereby produce an aqueous dispersion. The dispersion had 20% of volatiles, a viscosity of 3.5 cPs and a particle size of 0.20 μm. The dispersion had good stability since it could be stored for one month at room temperature without forming a precipitate.

EXAMPLE 7

A four-necked glass flask the same as used in Example 1 was charged with 70 g of a liquid epoxy resin "Epikote 828" and 15.9 g of styrene and 10.5 g of methyl acrylate (both being "component C"), and the mixture was kneaded as in Example 1 and cooled to room temperature. To the mixture, 3.6 g of methacryloyloxyethyltrimethylammonium chloride was added as "component B" together with 4.8 g of ethanol, and the resulting mixture was stirred for about one hour at room temperature in a nitrogen atmosphere until a uniform fluid mixture was obtained. The mixture was sandwiched between Mylar films 0.1 mm thick, placed on a Dry Ice bath, and irradiated with electron beams from a Cockcroft-Walton accelerator as in Example 1 to give a total dose of 39 Megarad.

Twenty grams of the fine particles of irradiated mixture was put in a 300 ml-flask, and mixed with 14 g of a mixed solvent made of butanol, cyclohexanone, cyclohexanol and butyl Cellosolve (2:1:2:1 by weight) under agitation with a 3-blanded impeller for about 2 hours at room temperature until a complete solution was produced. Then, 66 g of purified water was gradually added to the solution under vigorous agitation to thereby produce an aqueous dispersion. The dispersion had 20% of non-volatiles, and a viscosity of 5.5 cPs. The dispersion had good stability and was able to be stored for two months at room temperature without forming a precipitate.

What is claimed is:

1. A self-curing modified epoxy resin composition produced by irradiating with electron beams a mixture mainly composed of 60 to 98% by weight of an epoxy resin and 2 to 30% by weight of a quaternary salt containing an α,β-unsaturated carboxylic acid ester having one quaternized amine nitrogen atom in the ester group.

2. A self-curing modified epoxy resin composition composed of 60 to 98% by weight of an epoxy resin, 2 to 30% by weight of a quaternary salt containing an α,β-unsaturated carboxylic acid ester having one quaternized amine nitrogen atom in the ester group and an effective amount of not more than 38% by weight of another polymerizable monomer having one ethylenically unsaturated bond in the molecule.

3. A self-curing modified epoxy resin composition according to claim 1 or 2 wherein the epoxy resin has in its molecule at least one group selected from the group consisting of a methylene group and a methine group.

4. A self-curing modified epoxy resin composition according to claim 1 or 2 wherein the alcohol group of the ester is selected from the group consisting of a 2-N,N-dimethylaminoethyl group, 2-N,N-diethylaminoethyl group, 2-N,N-dibutylaminoethyl group, 3-N,N-diethylaminopropyl group, 2-N,N-dibutylaminopropyl group, 3-N,N-dibutylaminopropyl group, 2-N-t-butylaminoethyl group, 2-N-ethyl-N-(hydroxyethyl)aminoethyl group and a 3-N,N-dimethylamino-2-hydroxypropyl group.

5. A self-curing modified epoxy resin composition according to claim 2 wherein the other polymerizable monomer having one ethylenically unsaturated bond in the molecule is selected from the group consisting of styrene, β-methoxystyrene, α-methylstyrene, acrylic acid ester, methacrylic acid ester, acrylonitrile and methacrylonitrile.

6. A self-curing modified epoxy resin composition according to claim 1 or 2 wherein the quaternary salt is produced by addition reaction between an alkyl halide and an α,β-unsaturated carboxylic acid ester having one quaternizable amine nitrogen atom in the ester group.

7. A self-curing modified epoxy resin composition according to claim 1 wherein the epoxy resin is mixed with the α,β-unsaturated carboxylic acid having one quaternized amine nitrogen atom in the ester group.

8. A self-curing modified epoxy resin composition according to claim 2 wherein a mixture of the epoxy resin and the other polymerizable monomer having one ethylenically unsaturated bond in the molecule is further mixed with the quaternary salt of α,β-unsaturated carboxylic acid ester having one quaternized amine nitrogen atom in the ester group.

9. A self-curing modified epoxy resin composition according to claim 2 wherein the epoxy resin, the quaternary salt containing α,β-unsaturated carboxylic acid ester having one quaternized amine nitrogen atom in the ester group, and the other polymerizable monomer having one ethylenically unsaturated bond in the molecule are mixed in an inert gas atmosphere.

10. A self-curing modified epoxy resin composition according to claim 8 wherein the epoxy resin is mixed with the other polymerizable monomer having one ethylenically unsaturated bond in the molecule at temperature below 70° C.

11. A self-curing modified epoxy resin composition according to claim 1 or 2 wherein the mixture is irradiated with electron beams at a temperature between $-50°$ and 50° C.

12. A self-curing modified epoxy resin composition according to claim 1 or 2 wherein the mixture is irradiated with electron beams in a dose rate between $1 \times 10^4$ and $3 \times 10^6$ rad/sec to give a total dose between 0.5 and 50 Mrad.

13. A dispersion produced by dissolving 100 parts by weight of the self-curing modified epoxy resin composition of claim 1 or 2 in 30 to 200 parts by weight of an organic solvent, and mixing the solution with 100 to 500 parts by weight of water per 100 parts by weight of the composition under agitation.

* * * * *